United States Patent [19]
Nishigaki et al.

[11] Patent Number: 5,419,330
[45] Date of Patent: May 30, 1995

[54] ULTRASONIC DIAGNOSTIC EQUIPMENT

[75] Inventors: Morio Nishigaki, Fujisawa; Hiroshi Fukukita, Tokyo; Hisashi Hagiwara, Yokohama, all of Japan

[73] Assignee: Matsushita Electric Industrial Co., Ltd., Kadoma, Japan

[21] Appl. No.: 294,013

[22] Filed: Aug. 23, 1994

[30] Foreign Application Priority Data

Sep. 3, 1993 [JP] Japan .................................. 5-219603

[51] Int. Cl.$^6$ .................................................. A61B 8/00
[52] U.S. Cl. ................................................ 28/661.01
[58] Field of Search ..................... 128/660.08, 661.01, 128/661.02, 660.07; 73/602, 633

[56] References Cited

U.S. PATENT DOCUMENTS

| | | | |
|---|---|---|---|
| 4,566,460 | 1/1986 | Sato et al. | 128/661.02 |
| 4,974,558 | 12/1990 | Katakura et al. | 128/661.01 |
| 5,186,177 | 2/1993 | O'Donnell et al. | 128/661.01 |

OTHER PUBLICATIONS

P. D. Corl et al., "A digital synthetic focus acoustic imaging system for NDE", *Proc. IEEE Ultrasonics Symp.*, Sep. 1978, pp. 263–268.

*Primary Examiner*—George Manuel
*Attorney, Agent, or Firm*—Spencer, Frank & Schneider

[57] ABSTRACT

In an ultrasonic diagnostic equipment for performing synthetic aperture, deterioration of picture quality produced by the movement of an object is prevented, thereby to provide an excellent image. Arrayed piezoelectric transducers are driven by a transmitting circuit so as to transmit ultrasonic waves into a body, and, among echoes received by piezoelectric transducers, first the signals of the piezoelectric transducers are selected by amplified appropriately by amplifiers and converted into digital signals by added with delay by a beam former thereafter, and stored in a memory. Similarly, the ultrasonic waves are transmitted again, signals of the piezoelectric transducers are selected by the applied with similar signal processing in the amplifiers, and the beam former, and added to signals added with delay of the piezoelectric transducers T3 to T6 stored in a memory 16 by an adder. The added signals are displayed on a display unit after applying signal processing such as detection in a signal processing portion.

17 Claims, 8 Drawing Sheets

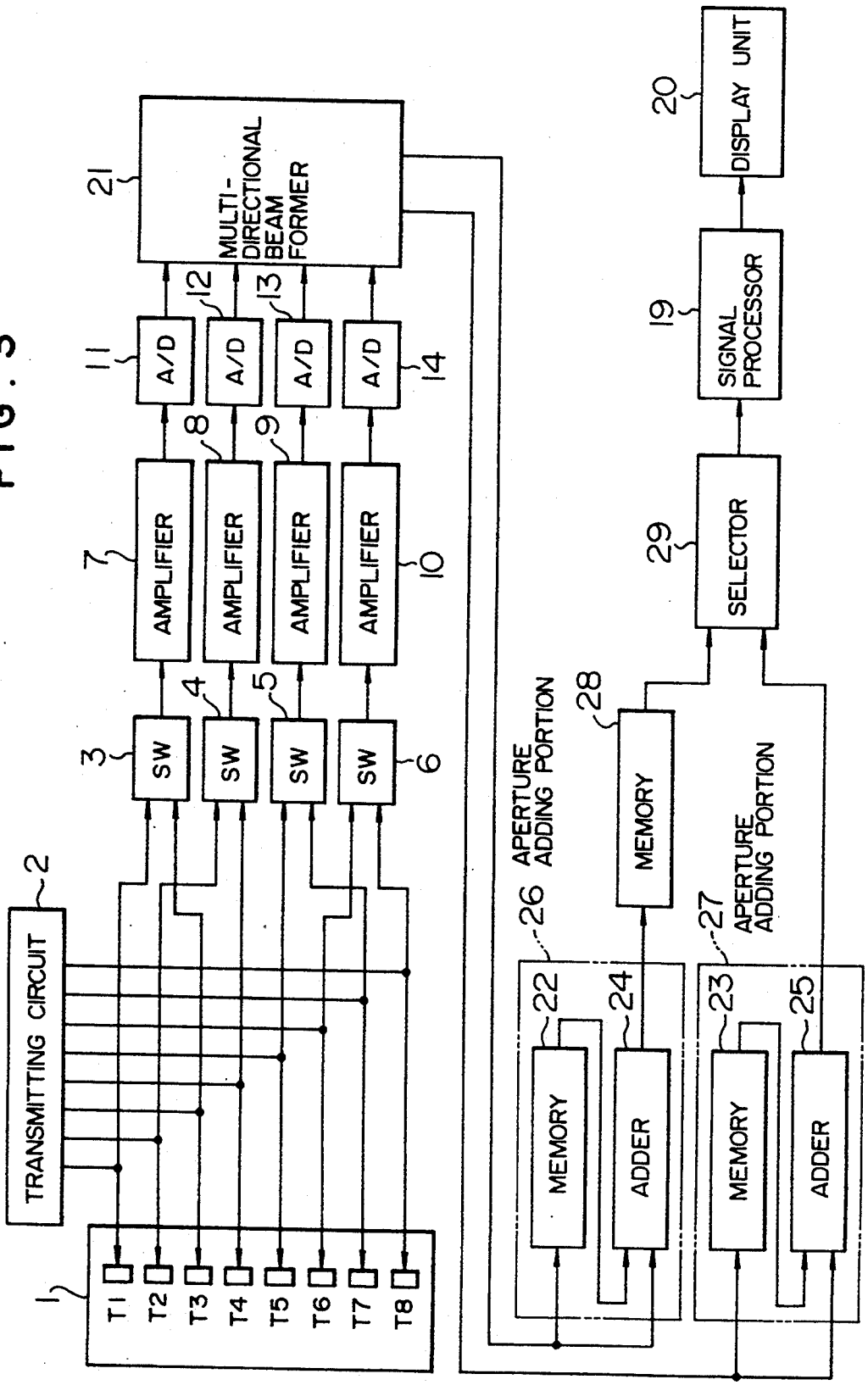

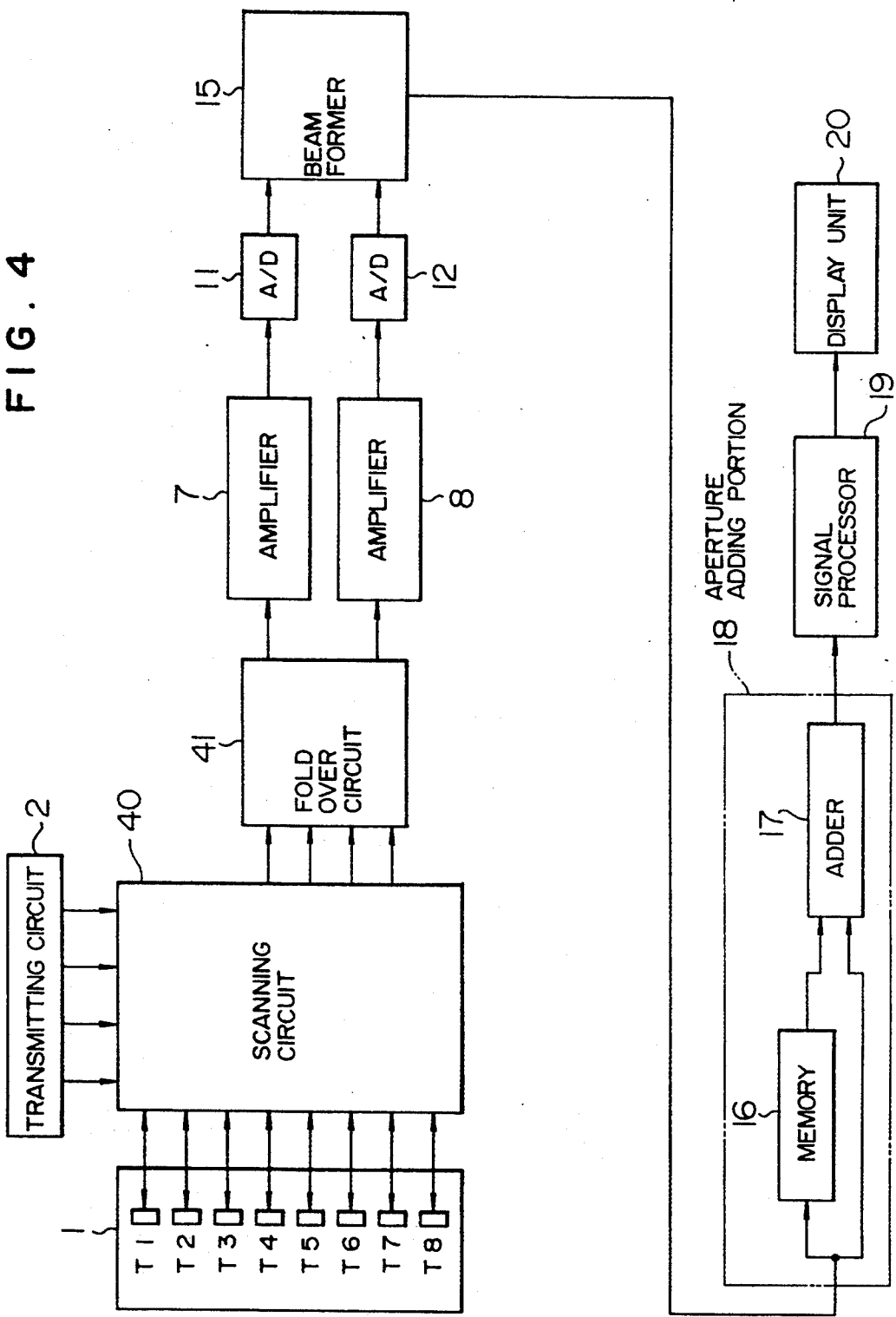

ULTRASONIC DIAGNOSTIC EQUIPMENT

BACKGROUND OF THE INVENTION

The present invention relates to an ultrasonic diagnostic equipment having a synthetic aperture receiving portion or a fold over portion of received signals.

An ultrasonic imaging apparatus for performing synthetic aperture scanning is known recently. This ultrasonic imaging apparatus has been introduced in P.D. Corl, et al. "A digital synthetic focus acoustic imaging system for NDE", Proc IEEE Ultrasonics Symp., Sept. 1978, and the principle of the operation thereof will be described with reference to a schematic block diagram shown in FIG. 8.

In FIG. 8, a reference numeral 1 represents an ultrasonic probe, which is composed of piezoelectric transducers T1 to T8. 100 represents a multiplexer (hereinafter referred to as a MUX), 101 a transmitting circuit, 102 an amplifier, 103 an A/D converter (hereinafter referred to as an A/D), 104 a memory, 105 an adder, 106 a signal processor and 107 a display unit. In FIG. 8, the MUX 100 selects one of the piezoelectric transducers T1 to T8, i.e., Tn. Next, the transmitting circuit 101 generates driving pulses, thereby to drive the selected piezoelectric transducer Tn.

The piezoelectric transducer Tn generates ultrasonic pulses, and the ultrasonic pulses reflected in an object are received by the piezoelectric transducer Tn as an echo ultrasonic wave. The received signals received by the piezoelectric transducer Tn are converted into digital data in the A/D 103 and written in the memory 104 after passing through the MUX 100 and being amplified by the amplifier 102. When the write of the received signals into the memory 104 from the piezoelectric transducer Tn is completed, then the MUX 100 selects a piezoelectric transducer Tn' different from the piezoelectric transducer Tn, and writes the received signals into the memory 104 in a similar manner as the case of the piezoelectric transducer Tn. In a manner as described above, the received signals obtained by the piezoelectric transducers T1 to T8 are written into the memory 104. Next, in the adder 105, respective received signals obtained from the piezoelectric transducers T1 to T8 that are stored in the memory 104 are added while providing them with a predetermined time difference.

When it is assumed that the object is at a standstill during the period of reception by the piezoelectric transducers T1 to T8, it is possible to give receiving directivity such as beam forming and beam steering in the object to the ultrasonic probe 1. The received signals added by the adder 105 as described above are applied with signal processing such as detection by the signal processor 106 and displayed on the display unit 107.

In the above-mentioned conventional ultrasonic diagnostic equipment having a synthetic aperture portion, however, there has been such a problem that the synthetic aperture portion cannot be operated accurately when the object has moved during the period of reception by the piezoelectric transducers T1 to T8.

SUMMARY OF THE INVENTION

The present invention is to solve such a conventional problem and has for its object to provide an ultrasonic diagnostic equipment capable of operating accurate synthetic aperture even when an object has moved.

According to the present invention set forth in claim 1, in order to achieve the object mentioned above, there is provided means for conducting reception at a central portion of the aperture of arrayed piezoelectric transducers and reception in a peripheral portion of the aperture of the arrayed piezoelectric transducers in regard to transmission in a plurality of times, and beam forming respective received signals obtained in every reception mentioned above, and weighting is applied at that time.

According to the present invention set forth in claim 2, in order to achieve the object mentioned above, there is provided means for conducting reception at a central portion of the aperture of arrayed piezoelectric transducers and reception in a peripheral portion of the aperture of the arrayed piezoelectric transducers in regard to transmission in a plurality of times, and beam forming respective received signals obtained in every reception mentioned above, and dynamic weighting is applied at that time.

According to the present invention set forth in claims 3 and 4, in order to achieve the object mentioned above, there is provided means for conducting reception at a central portion of the aperture of arrayed piezoelectric transducers and reception in a peripheral portion of the aperture of the arrayed piezoelectric transducers in regard to transmission in a plurality of times, and beam forming respective received signals obtained in every reception mentioned above, and reception is made simultaneously and in multi-directions at that time.

According to the present invention set forth in claims 5 and 6, in order to achieve the object mentioned above, there is provided means for conducting reception at a central portion of the aperture of arrayed piezoelectric transducers and reception in a peripheral portion of the aperture of the arrayed piezoelectric transducers in regard to transmission in a plurality of times, and beam forming respective received signals obtained in every reception mentioned above, and reception is made simultaneously and in multi-directions at that time, and a received data alignment function is provided in the synthesis of the received signals.

According to the present invention set forth in claims 7 to 12, in order to achieve the object mentioned above, there is provided means for conducting reception at a central portion of the aperture of arrayed piezoelectric transducers and reception in a peripheral portion of the aperture of the arrayed piezoelectric transducers in regard to transmission in a plurality of times, and beam forming respective received signals obtained in every reception mentioned above, and an aperture movement scanning function is provided.

According to the present invention set forth in claim 13, reception at the central portion of an aperture of arrayed piezoelectric transducers is made to show higher sensitivity as compared with the reception in the peripheral portion, thereby to eliminate the fear of missing a main lobe at time of beam forming the received signals under the worst conditions, thus realizing a highly precise synthetic aperture.

According to the present invention set forth in claim 14, reception at the central portion of an aperture of arrayed piezoelectric transducers is made to show higher sensitivity as distance gets shorter as compared with reception in a peripheral portion, thereby to eliminate the fear of vanishing a main lobe even at time of beam forming the received signals under the worst conditions, thus realizing a highly precise synthetic aperture.

According to the present invention set forth in claims 15 and 16, reception at the central portion of an aperture of arrayed piezoelectric transducers is made to show higher sensitivity as compared with the reception in the peripheral portion, thereby to eliminate the fear of missing a main lobe at time of beam forming the received signals under the worst conditions, thus realizing a highly precise synthetic aperture, and moreover, simultaneous reception in multi-directions is made so as to evade lowering of a frame rate of a sectional image due to the synthetic aperture.

According to the present invention set forth in claim 17, reception at the central portion of an aperture of arrayed piezoelectric transducers is made to show higher sensitivity as compared with the reception in the peripheral portion, thereby to eliminate the fear of missing a main lobe at time of beam forming the received signals under the worst conditions, thus realizing a highly precise synthetic aperture, and moreover, an aperture movement scanning function is realized at the same time.

BRIEF DESCRIPTION OF THE DRAWINGS

FIG. 3 is a schematic block diagram showing a second embodiment of an ultrasonic diagnostic equipment according to the present invention;

FIG. 4 is a schematic block diagram showing a third embodiment of an ultrasonic diagnostic equipment according to the present invention;

DESCRIPTION OF PREFERRED EMBODIMENTS

Figure 1:
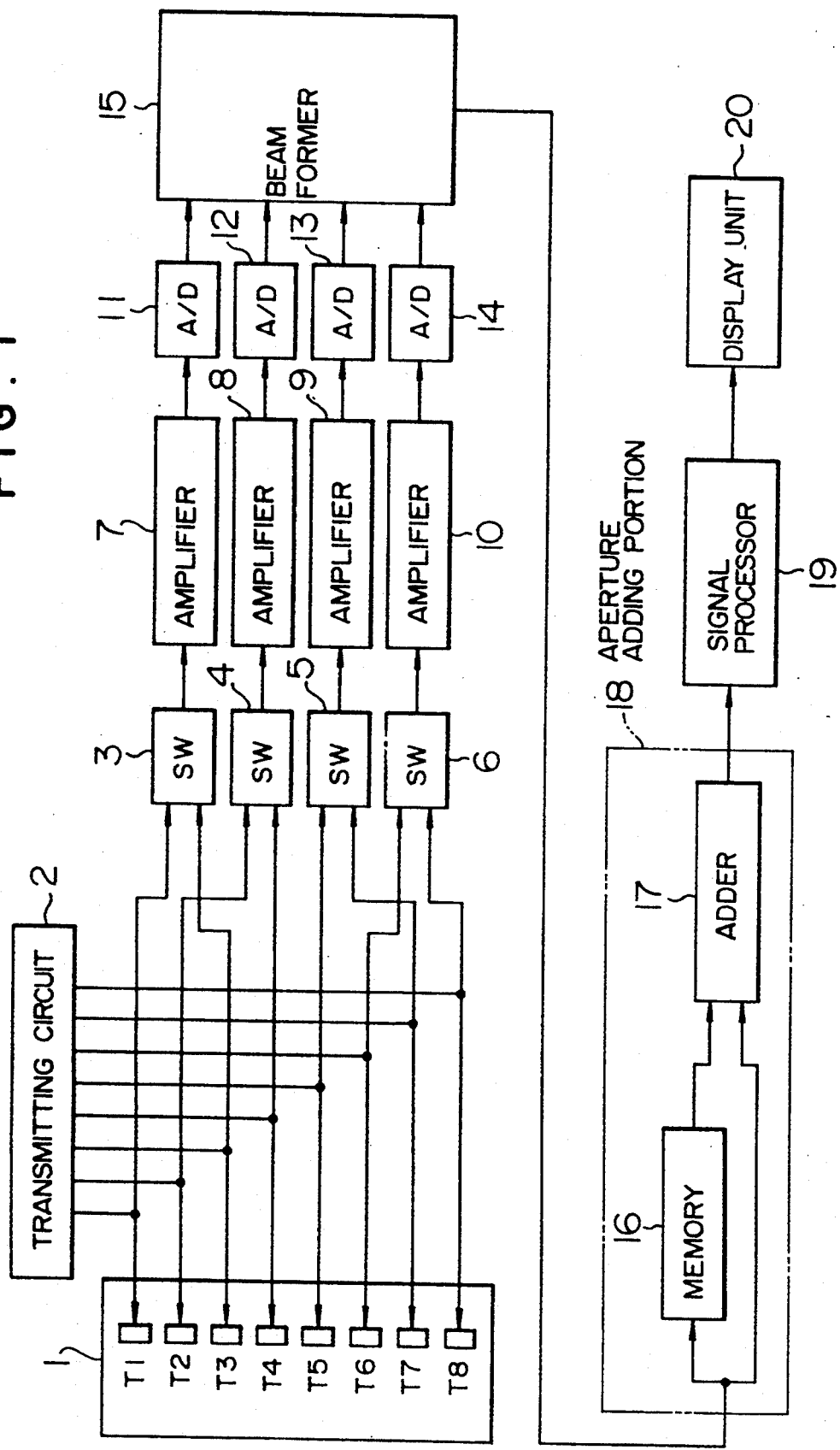
FIG. 1 is a schematic block diagram showing a first embodiment of an ultrasonic diagnostic equipment according to the present invention.

A first embodiment of the present invention will be described hereinafter with reference to the drawings. FIG. 1 is a schematic block diagram showing the first embodiment of an ultrasonic diagnostic equipment according to the present invention.

In FIG. 1, a reference 1 represents an ultrasonic probe, which is composed of 8 pieces of piezoelectric transducers T1 to T8 in this embodiment. 2 represents a transmitting circuit, 3 to 6 switches (hereinafter referred to as SWs), 7 to 10 amplifiers, 11 to 14 A/D converters (hereinafter referred to as A/Ds). 15 a beam former, 16 a memory and 17 an adder. An aperture adding portion 18 is formed of the memory 16 and the adder 17. 19 represents a signal processor and 20 represents a display unit.

The above-mentioned structure will be described in further detail hereinafter along with the operation thereof.

In FIG. 1, the transmitting circuit 2 generates driving pulses, thereby to drive piezoelectric transducers T1 to T8. A phase difference is provided among respective driving pulses applied to the piezoelectric transducers T1 to T8, ultrasonic beams transmitted from the ultrasonic probe 1 are beam-formed or beam-steered with the directivity thereof being controlled. The transmitted ultrasonic beams are reflected in an object and received by the ultrasonic probe 1. SW3 to SW6 select the received signals of the piezoelectric transducers T3 to T6 located at a central portion of the aperture of the arrayed piezoelectric transducers of the probe 1 in regard to the first wave transmission. The signals which have passed through SW3 to SW6 are amplified by the amplifiers 7 to 10. Weighting is applied in the amplifiers 7 to 10 in the present embodiment.

Figure 2A:
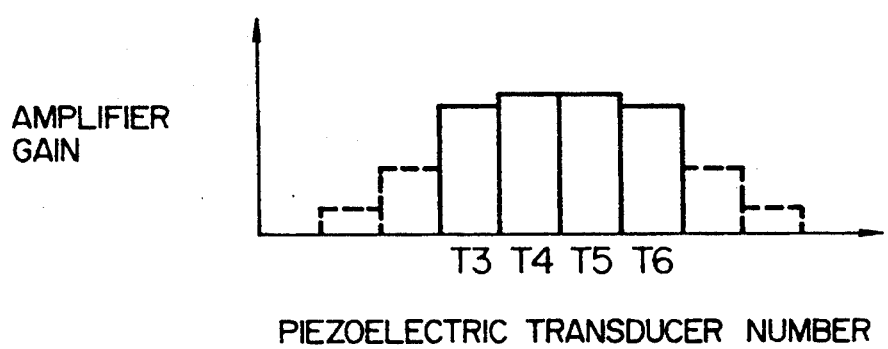
FIG. 2A and FIG. 2B are diagrams showing gains for received signals of the ultrasonic diagnostic equipment.
Figure 2B:
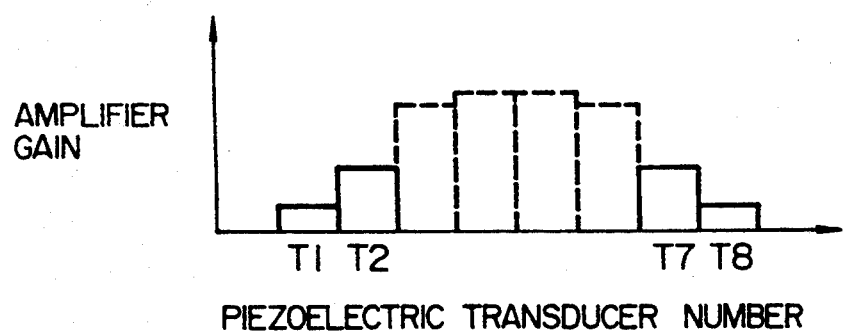

FIG. 2A and FIG. 2B are diagrams showing distribution of weighting described above. As shown in FIG. 2A, gains are given to the selected piezoelectric transducer numbers T3 to T6. The outputs of the amplifiers 7 to 10 are converted into digital signals in the A/Ds 11 to 14, which are added in the beam former 15. In the beam former 15, a delay time is given to the outputs of respective A/Ds 11 to 14, and directivity of reception is given to the ultrasonic probe 1. The output from the beam former 15 is stored in the memory 16. A received echo for the first wave transmission is stored in the memory 16 in a manner described above.

Next, the transmitting circuit 2 performs a second wave transmission. The second transmitted beam is the same as the first transmitted beam. SW3 to SW6 select received signals from the piezoelectric transducers T1, T2, T7 and T8 in the peripheral portion of the aperture of the arrayed piezoelectric transducers of the ultrasonic probe 1 for the second wave transmission. With the signals which have passed through SW3 to SW6, gains are given to the piezoelectric transducers T1, T2, T7 and T8 as shown in FIG. 2B. High gains are given to the received signals from the piezoelectric transducers at the central portion of the arrayed piezoelectric transducers as shown in FIG. 2A and FIG. 2B, and low gains are given to the received signals from the piezoelectric transducers in the peripheral portion. The outputs of the amplifiers 7 to 10 are converted into digital signals in the A/Ds 11 to 14, and are added in the beam former 15. In the beam former 15, a delay period of time is given to the outputs of respective A/Ds 11 to 14, and directivity of reception is given to the ultrasonic probe 1. The output from the beam former 15 is beam-formed with received signals from the piezoelectric transducers T3 to T6 that are stored in the memory 16 in the adding portion 18. A received beam in one direction is beam-formed for wave transmission in the same direction in two times in such a manner. It is possible to scan the whole object by varying the directivity of wave transmission and reception. The beam-formed received beam thus obtained is detected by the signal processor 19 and displayed on the display unit 20.

As described above, according to the present embodiment, the received signals before beam-formed in the aperture adding portion 18 consists of the received signals from the piezoelectric transducers at the central portion of the aperture of the ultrasonic probe 1 and the received signals from the piezoelectric transducers in the peripheral portion, and high gains are given to the received signals from the piezoelectric transducers at the central portion and low gains are given to the received signals from the piezoelectric transducers in the peripheral portion, thus applying weighting. As a result, there is such an advantage that, even when the object has moved during wave transmission two times, the received signals from the piezoelectric transducers at the central portion are rarely disturbed since they are obtained by reception one time, and moreover, are larger in amplitude than the signals from the piezoelectric transducers in the peripheral portion, thus making it possible to realize a highly precise synthetic aperture.

Besides, weighting has been applied by amplifiers in the above description, but may be applied by digital multiplication on digital data applied with A/D conversion. Further, a technique for controlling receiving sensitivity of the piezoelectric transducer may also be used.

Further, it has been assumed in the above description that the gains of weighting are constant independently of the depth, but it is also possible to vary the gain of weighting depending on the width, that is, to apply weighting dynamically. In this case, the aperture becomes narrower in reception at a short distance, and contribution by the received signals from the piezoelectric transducers in the peripheral portion of the aperture of the ultrasonic probe disappears substantially. Namely, since the output beam-formed of received beams only by the piezoelectric transducers at the central portion of the ultrasonic probe is obtainable, the precision of the synthetic aperture will never be lowered by the movement of the object.

A second embodiment of the present invention will be described hereinafter with reference to the drawings.

FIG. 3 is a schematic block diagram showing the second embodiment of an ultrasonic diagnostic equipment according to the present invention.

In FIG. 3, 21 represents a multi-directional beam former, 22 and 23 memories and 24 and 25 adders. Aperture adding portions 26 and 27 are composed of the memory 22 and the adder 24, and the memory 23 and the adder 25, respectively. 28 represents a memory and 29 represents a selector. The other structure is the same as that of the first embodiment described above.

The above structure will be described in further detail hereinafter along with the operation thereof.

In FIG. 3, the transmitting circuit 2 generates driving pulses, thereby to drive piezoelectric transducers T1 to T8. A phase difference is provided among respective driving pulses applied to the piezoelectric transducers T1 to T8, ultrasonic beams transmitted from the ultrasonic probe 1 are beam-formed or beam-steered with the directivity thereof being controlled. The transmitted ultrasonic beams are reflected in an object and received by the ultrasonic probe 1. SW3 to SW6 select the received signals of the piezoelectric transducers T3 to T6 located at a central portion of the aperture of the probe 1 in regard to the first wave transmission. The signals which have passed through SW3 to SW6 are amplified by the amplifiers 7 to 10. Weighting is applied in the amplifiers 7 to 10 in the present embodiment. The outputs of the amplifiers 7 to 10 are converted into digital signals by the A/Ds 11 to 14, which are added by the multi-direction beam former 21. In the multi-direction beam former 21, two kinds of delay time are given to the outputs of respective A/Ds 11 to 14, and directivity of reception in two directions is given to the ultrasonic probe 1. The outputs in two systems from the multi-direction beam former 21 are stored in the memories 22 and 23 of the aperture adding portions 26 and 27 corresponding to the sensitivity of reception in two directions described above. In a manner described above, received echoes for the first wave transmission are stored in the memories 22 and 23.

Next, the transmitting circuit 2 transmits a wave for the second time. The second transmitted beam is the same as the first transmitted beam. SW3 to SW6 select the received signals from the piezoelectric transducers T1, T2, T7 and T8 in the peripheral portion of the aperture of the probe 1 for the second wave transmission. The gains weighted by the amplifiers 7 to 10 are given to the signals that have passed through SW3 to SW6. As shown in FIG. 2A and FIG. 2B, high gains are given to the received signals from the piezoelectric transducers at the central portion of the aperture, and low gains are given to the received signals from the piezoelectric transducers in the peripheral portion of the aperture. The outputs of the amplifiers 7 to 10 are converted into digital signals by the A/Ds 11 to 14, which are added in the multi-direction beam former 21. In the multi-direction beam former 21, two kinds of delay time are given to the outputs of respective A/Ds 11 to 14, and directivity of reception in two directions is given to the ultrasonic probe 1. The outputs from the multi-direction beam former 21 are beam-formed with the received signals from the piezoelectric transducers T3 to T6 that are stored in the memories 22 and 23 in the adders 24 and 25, respectively. The received beams in two directions are beam-formed in regard to the second wave transmission in the same direction in a manner as described above. The output from the aperture adding portion 26 is written into the memory 28 and given with one transmission portion's worth of delay. For the timing of wave transmission in which the beam output beam-formed in the aperture adding portion 27, the selector 29 selects the output of the aperture adding portion 27, and selects the output of the memory 28 when the beams are not beam-formed in the aperture adding portion 27. A received beam beam-formed in every timing of wave transmission is obtained by realizing the received data aligning function in a manner as described above. It is possible to scan the whole object by varying the directivity of wave transmission and reception. The received signal thus beam-formed is detected by the signal processor 19 and displayed on the display unit 20.

As described above, according to the present embodiment, the received signals before beam-formed by the aperture adding portions 26 and 27 consist of the received signals from the piezoelectric transducers at the central portion of the aperture of the ultrasonic probe 1 and the received signals from the peripheral portion of the aperture, and high gains are given to the received signals from the piezoelectric transducers at the central portion of the aperture and low gains are given to the received signals from the peripheral portion of the aperture. As a result, there is such an advantage that the received signals from the piezoelectric transducers at the central portion of the aperture are not disturbed largely even when the object has moved during wave transmission two times, and moreover, are larger in amplitude than the signals from the piezoelectric transducers in the peripheral portion of the aperture, thus making it possible to realize a highly precise synthetic aperture. Furthermore, there is such an advantage that the beam-formed aperture output is obtainable for every wave transmission by combining the multi-direction beam forming function with the received data alignment function for storing the beam-formed beam.

A third embodiment of the present invention will be described hereinafter with reference to the drawings.

FIG. 4 is a schematic block diagram showing the third embodiment of an ultrasonic diagnostic equipment according to the present invention.

Figure 5:
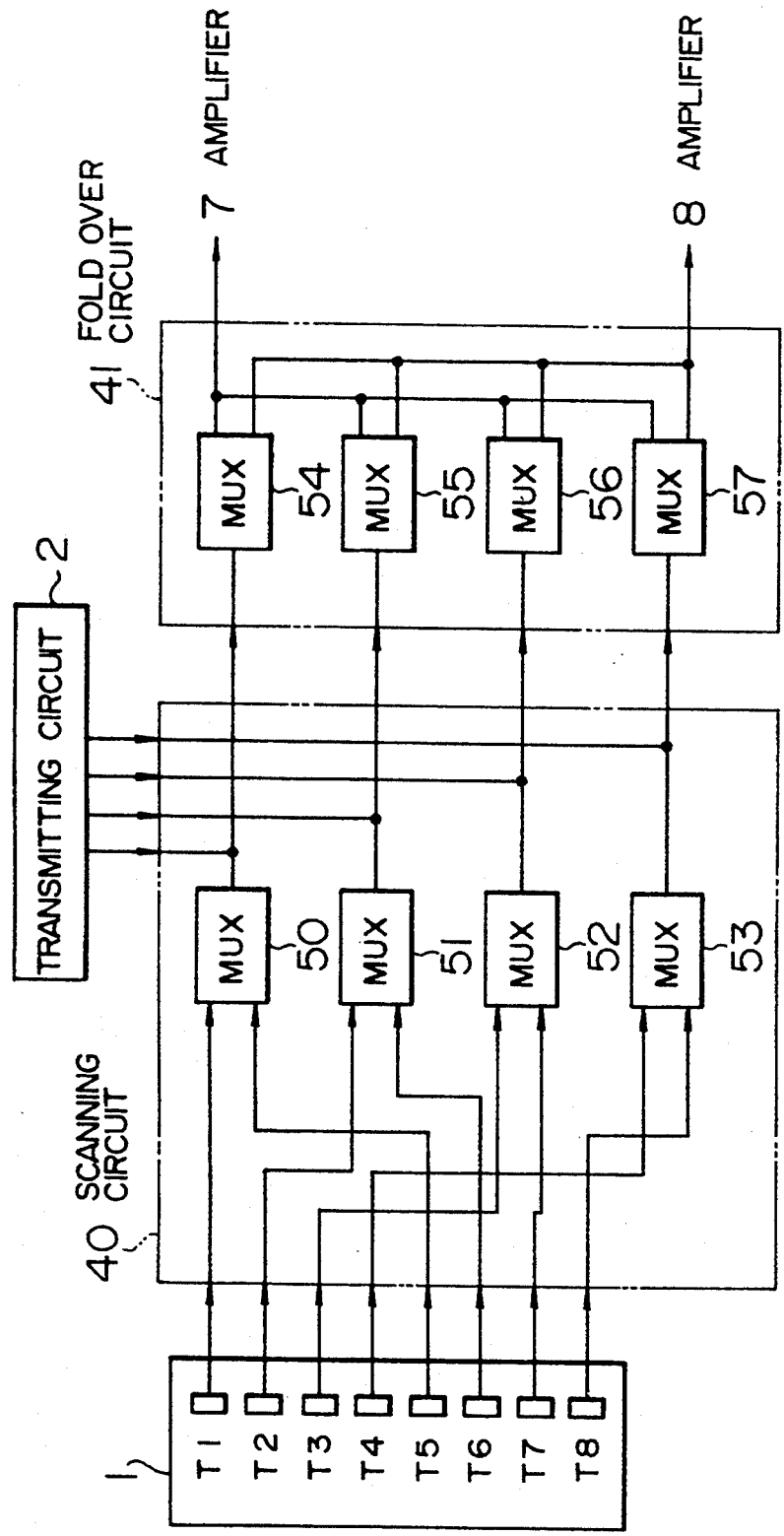
FIG. 5 is a schematic block diagram showing a scanning circuit and a fold over circuit of the ultrasonic diagnostic equipment.

In FIG. 4, 40 represents a scanning circuit and 41 represents a fold over circuit. The other structure is the same as that in the first embodiment. FIG. 5 is a schematic block diagram showing the scanning circuit 40 and the fold over circuit 41. As shown in FIG. 5, the scanning circuit 40 is provided with MUXs 50, 51, 52 and 53, and the fold over circuit 41 is provided with MUXs 54, 55, 56 and 57.

The structure will be described in further detail hereinafter along with the operation thereof.

In FIG. 5, the MUXs 50, 51, 52 and 53 of the scanning circuit 40 select the piezoelectric transducers T1, T2, T3 and T4 of the probe 1. The transmitting circuit 2 generates the first driving pulses, thereby to drive the piezoelectric transducers T1 to T4. A phase difference is given among respective driving pulses applied to the piezoelectric transducers T1 to T4, and the directivity of the ultrasonic beams transmitted from the ultrasonic probe 1 is controlled, thus beam forming the beams. The transmitted ultrasonic beams are reflected in the object and received by the ultrasonic probe 1. The signals received by the piezoelectric transducers T1, T2, T3 and T4 of the ultrasonic probe 1 pass through the MUXs 50, 51, 52 and 53 and are inputted to the MUXs 54, 55, 56 and 57 of the fold over circuit 41. In the MUXs 54, 55, 56 and 57, switches are selected so that the signals from the piezoelectric transducers located at positions of symmetry with respect to the center of the aperture of the ultrasonic probe are added. In this case, the piezoelectric transducers T1 and T4, and the piezoelectric transducers T2 and T3 are added. Such a state of the fold over circuit 41 is referred to as a fold over state, and a corresponding scanning mode is referred to as a fold over scanning mode.

The outputs of the fold over circuit 41 are amplified by the amplifiers 7 and 8 and converted into digital data by the A/Ds 11 and 12, and are added thereafter with delay by the beam former 15. The output of the beam former 15 bypasses the memory 16 and the adder 17 of the aperture adding portion 18 and is detected by the signal processor 19. When the first reception is completed, the MUXs 50, 51, 52 and 53 select the piezoelectric transducers T5, T2, T3 and T4. As against the above, switches are selected so that T5 and T2, and T3 and T4 are added in the fold over circuit 41. In such a manner, wave transmission and reception are repeated while the aperture scans the upside of the ultrasonic probe 1, and the aperture scanning movement function is realized and the received echoes are displayed on the display unit 20.

Next, a synthetic aperture scanning mode will be described.

In FIG. 5, the MUXs 50, 51, 52 and 53 select the piezoelectric transducers T1, T2, T3 and T4 of the probe 1. The transmitting circuit 2 generates the first driving pulses, thereby to drive the piezoelectric transducers T1 to T4. A phase difference is given among respective driving pulses applied to the piezoelectric transducers T1 to T4, and the directivity of the ultrasonic beams transmitted from the ultrasonic probe 1 is controlled, thus beam forming or beam steering the ultrasonic beams. The transmitted ultrasonic beams are reflected in the object and received by the ultrasonic probe 1. The signals received by the piezoelectric transducers T1, T2, T3 and T4 of the ultrasonic probe 1 pass through the MUXs 50, 51, 52 and 53, and are inputted to the MUXs 54, 55, 56 and 57 of the fold over circuit 41. In the MUXs 54, 55, 56 and 57, switches are controlled so that the signals from the piezoelectric transducers located at the central portion of the aperture of the ultrasonic probe are made to pass therethrough. In this case, the signals from the piezoelectric transducers T2 and T3 pass through the MUXs 55 and 56, and are inputted to the amplifiers 7 and 8, respectively. The signals from the piezoelectric transducers T1 and T4 are not inputted to the amplifiers 7 and 8 by turning the MUXs 54 and 57 off. The outputs of the fold over adder 41 are amplified by the amplifiers 7 and 8 and added with delay by the beam former 15 after being converted into digital data by the A/Ds 11 and 12. The output of the beam former 15 is stored in the memory 16 of the aperture adding portion 18.

When the first reception is completed, the MUXs 50, 51, 52 and 53 of the scanning circuit select the piezoelectric transducers T1, T2, T3 and T4 in a similar manner to the time of the first transmission. The transmitting circuit 2 generates the second driving pulses, thereby to drive the piezoelectric transducers T1 to T4. The second transmitted beams are the same as the first transmitted beams. The transmitted ultrasonic beams are reflected in the object and received by the ultrasonic probe 1. The signals received by the piezoelectric transducers T1, T2, T3 and T4 of the ultrasonic probe 1 pass through the MUXs 50, 51, 52 and 53 and are inputted to the MUXs 54, 55, 56 and 57 of the fold over circuit 41. In the MUXs 54, 55, 56 and 57, switches are controlled so that the signals from the piezoelectric transducers located in the peripheral portion of the aperture of the ultrasonic probe are made to pass therethrough. In this case, the signals from the piezoelectric transducers T1 and T4 pass through the MUXs 54 and 57 and are inputted to the amplifiers 7 and 8, respectively. The signals from the piezoelectric transducers T2 and T3 are not inputted to the amplifiers 7 and 8 by turning the MUXs 55 and 56 off.

The outputs of the fold over circuit 41 are amplified by the amplifiers 7 and 8 and added with delay by the beam former 15 after being converted into digital data by the A/Ds 11 and 12. The output of the beam former 15 is added by the adder 17 to the first received data stored in the memory 16 of the aperture adding portion 18. In such a manner, the received beam in one direction are beam-formed for wave transmission two times in the same direction. In the foregoing, high gains are given to the received signals from the piezoelectric transducers at the central portion of the aperture, and low gains are given to the received signals from the peripheral portion, thus applying weighting.

Such a state of the fold over circuit 41 is referred to as a synthetic aperture adding state, and a corresponding scanning mode is referred to as a synthetic aperture scanning mode. The output of the aperture adding portion 18 is detected by the signal processor 19. When the second reception is completed, the MUXs 50, 51, 52 and 53 of the scanning circuit select the piezoelectric transducers T5, T2, T3 and T4 and the third and the fourth transmission and reception are performed, thus obtaining the output of the aperture adding portion 18. In such a manner, wave transmission and reception are repeated while the aperture scans the upside of the ultrasonic probe 1, and received echoes are displayed on the display unit 20.

As described above, according to the present embodiment, the received signals before beam-formed by the aperture adding portion 18 consist of the received signals from the piezoelectric transducers at the central portion of the aperture of the ultrasonic probe 1 and the received signals from the peripheral portion of the aperture, and high gains are given to the received signals from the piezoelectric transducers at the central portion of the aperture and low gains are given to the received signals from the peripheral portion of the aperture. As a result, there is such an advantage that the received signals from the piezoelectric transducers at the central portion are not disturbed largely even when the object has moved during wave transmission two times, and moreover, have an amplitude larger than that of the signals from the piezoelectric transducers in the peripheral portion, thus making it possible to realize a highly precise synthetic aperture. Furthermore, the present embodiment also has such an advantage that the synthetic aperture scanning mode and the fold over scanning mode can be realized.

Next, a fourth embodiment of the present invention will be described with reference to the drawings.

Figure 6:
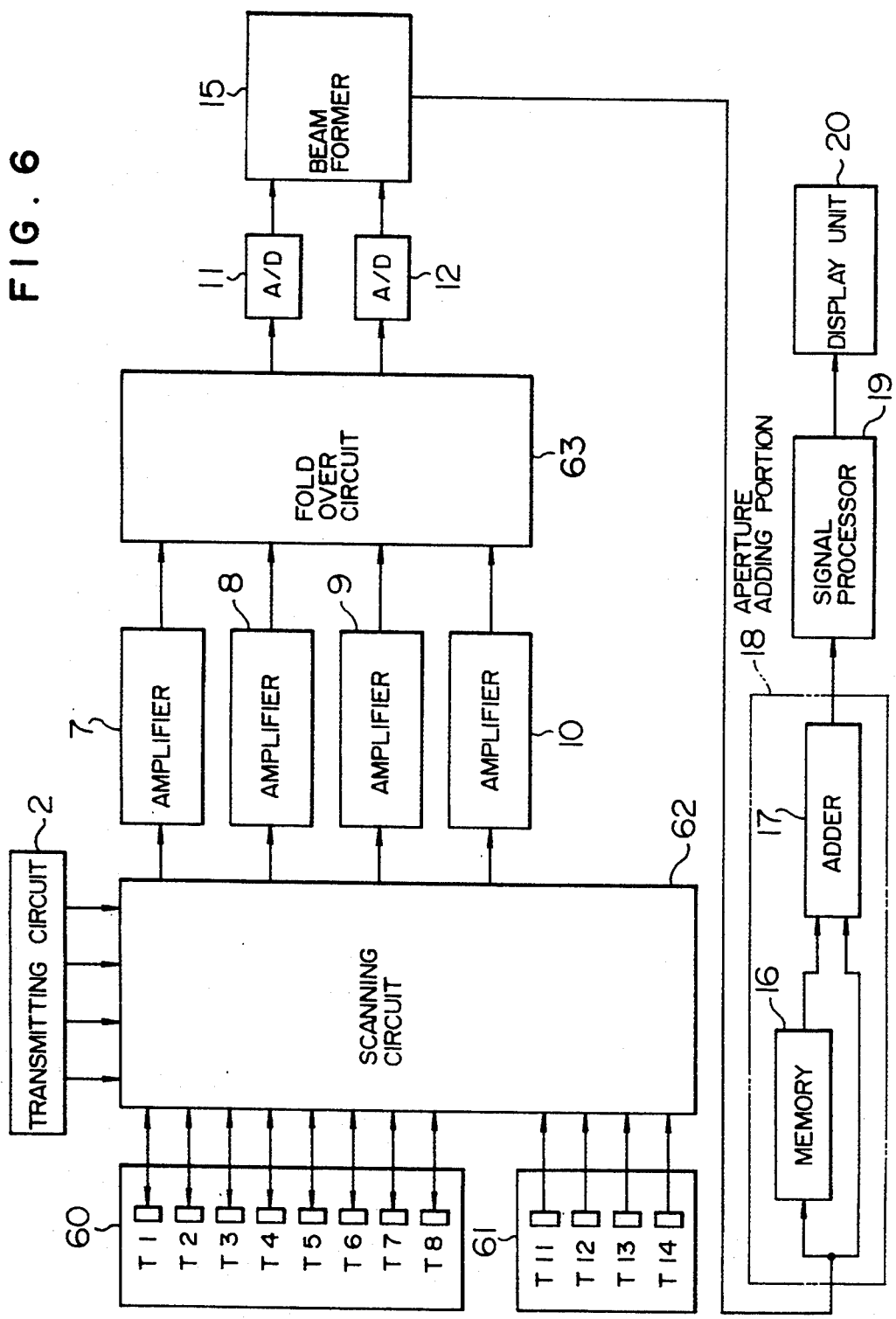
FIG. 6 is a schematic block diagram showing a fourth embodiment of an ultrasonic diagnostic equipment according to the present invention.

FIG. 6 is a schematic block diagram showing the fourth embodiment of an ultrasonic diagnostic equipment according to the present invention.

In FIG. 6, 60 represents an ultrasonic probe, which is composed of piezoelectric transducers T1 to T8. 61 represents another ultrasonic probe, which is composed of piezoelectric transducers T11 to T14. 62 represents a scanning circuit, and 63 represents a fold over circuit. The other structure is similar to that in the first embodiment described above.

Figure 7:
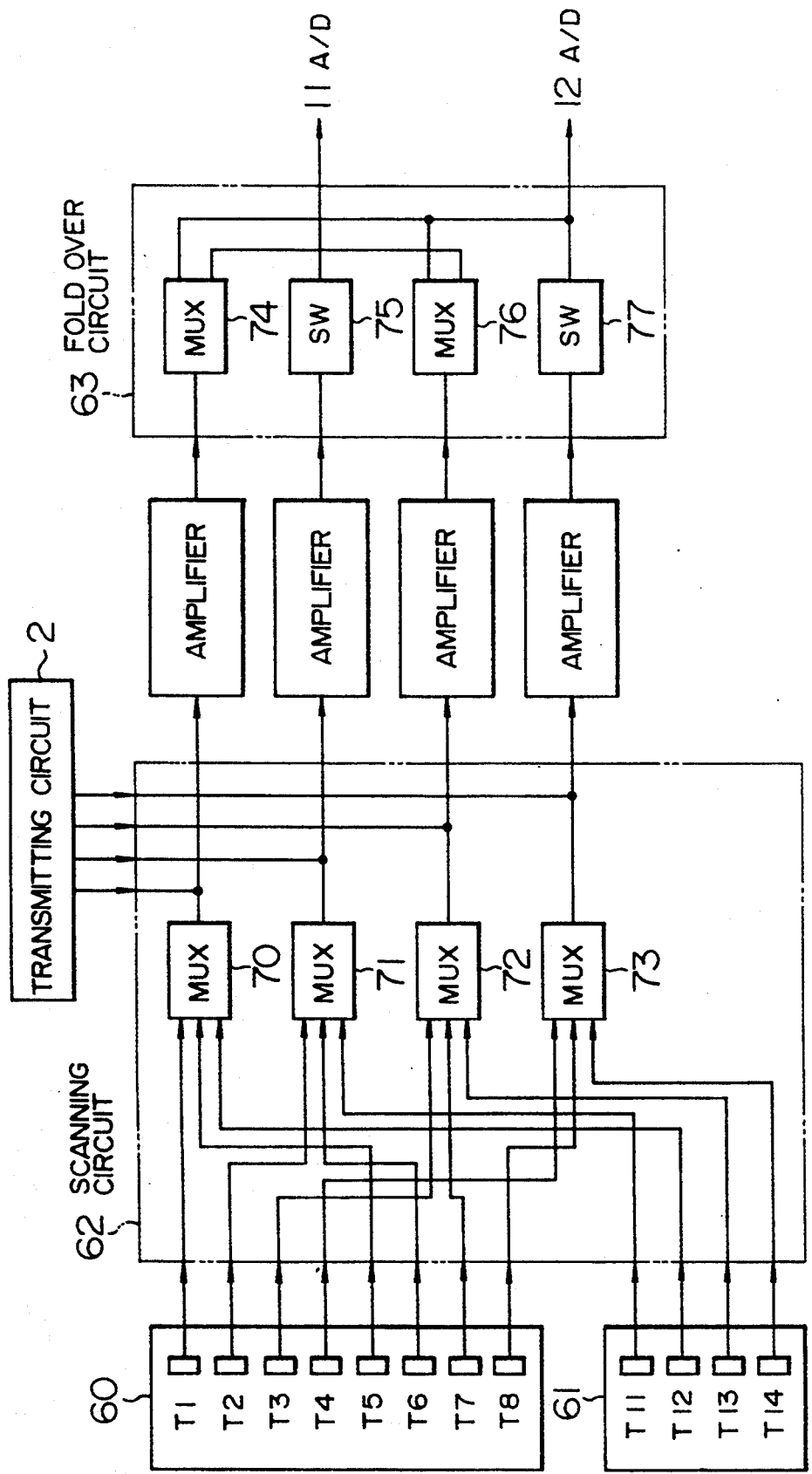
FIG. 7 is a schematic block diagram showing a scanning circuit and a fold over circuit of the ultrasonic diagnostic equipment.
Figure 8:
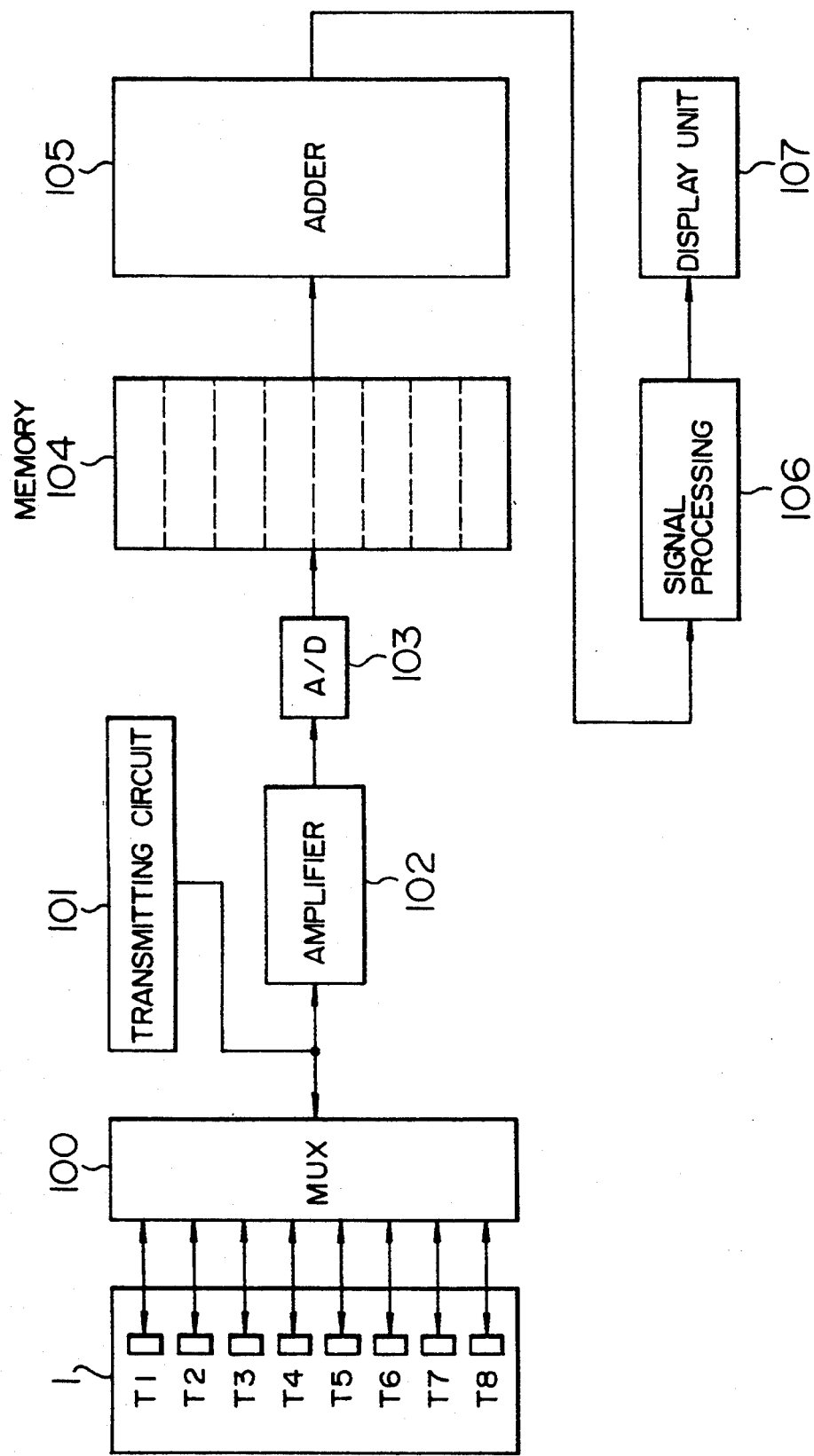
FIG. 8 is a schematic block diagram of a conventional ultrasonic diagnostic equipment.

FIG. 7 is a schematic block diagram showing the scanning circuit 62 and the fold over circuit 63. As shown in FIG. 7, the scanning circuit 62 is provided with MUXs 70, 71, 72 and 73, and the fold over circuit 63 is provided with MUXs 74 and 76 and SWs 75 and 77.

The above structure will be described in further detail hereinafter along with the operation thereof.

In FIG. 7, the MUXs 70, 71, 72 and 73 of the scanning circuit 62 select the piezoelectric transducers T1, T2, T3 and T4 of the probe 1. The transmitting circuit 2 generates the first driving pulses, thereby to drive the piezoelectric transducers T1 to T4. A phase difference is provided among the driving pulses applied to the piezoelectric transducers T1 to T4, and the ultrasonic beams transmitted from the ultrasonic probe 1 are beam-formed with the directivity thereof being controlled. The transmitted ultrasonic beams are reflected in the object and received by the ultrasonic probe 1. The signals received by the piezoelectric transducers T1 and T3 of the ultrasonic probe 1 pass through the MUXs 70 and 72 and are inputted to the MUXs 74 and 76 of the fold over circuit 63. The signals received by the piezoelectric transducers T2 and T4 pass through the MUXs 71 and 73 and are inputted to the SWs 75 and 77 of the fold over circuit 63. In the MUXs 74 and 76, the channels of the MUXs 74 and 76 are selected so that the signals from the piezoelectric transducers located at positions of symmetry with respect to the center of the aperture of the ultrasonic probe are added. In this case, the piezoelectric transducers T1 and T4 and the piezoelectric transducers T2 and T3 are added, respectively. Such a state of the fold over circuit 63 is referred to as a fold over state, and a corresponding scanning mode is referred to as a fold over scanning mode. The outputs of the fold over circuit 63 are converted into digital data by the A/Ds 11 and 12 into digital data, which are added with delay by the beam former 15 thereafter. The output of the beam former 15 bypasses the memory 16 and the adder 17 of the aperture adding portion 18 and is detected by the signal processor 19. When the first reception is completed, the MUXs 50, 51, 52 and 53 of the scanning circuit select the piezoelectric transducers T5, T2, T3 and T4 of the ultrasonic probe 60. As against the above, in the fold over circuit 63, the channels of the MUXs 74 and 76 are selected so that T5 and T2, and T3 and T4 are added, respectively. In such a manner, wave transmission and reception are repeated while the aperture scans the upside of the ultrasonic probe 1, and received echoes are displayed on the display unit 20.

Next, a synthetic aperture scanning mode will be described.

In FIG. 7, the MUXs 70, 71, 72 and 73 of the scanning circuit 62 select piezoelectric transducers T11, T12, T13 and T14 of the ultrasonic probe 60. The transmitting circuit 2 generates the first driving pulses, thereby to drive the piezoelectric transducers T11 to T14. A phase difference is provided among respective driving pulses applied to the piezoelectric transducers T11 to T14, and the ultrasonic beams transmitted from the ultrasonic probe 61 are beam-formed or reflected with the directivity thereof being controlled. The transmitted ultrasonic beams are reflected in the object and received by the ultrasonic probe 61. The signals received by the piezoelectric transducers T11, T12, T13 and T14 pass through the MUXs 70, 71, 72 and 73, and are inputted to the MUXs 74 and 76 and the SWs 75 and 77 of the fold over circuit 63. In the MUXs 74 and 76 and the SWs 75 and 77, the signals from the piezoelectric transducers located at the central portion of the aperture of the ultrasonic probe 61 pass therethrough. In this case, the signals from the piezoelectric transducers T12 and T13 pass the SWs 75 and 77, and are inputted to the A/Ds 11 and 12, respectively. The signals from the piezoelectric transducers T11 and T14 are not inputted to the A/Ds 11 and 12 by turning the MUXs 74 and 76 off. The outputs of the fold over circuit 63 are converted into digital data by the A/Ds 11 and 12, and added with delay by the beam former 15. The output of the beam former 15 is stored in the memory 16 of the aperture adding portion 18.

When the first reception is completed, the MUXs 70, 71, 72 and 73 of the scanning circuit 62 select the piezoelectric transducers T11, T12, T13 and T14 in a similar manner to the time of the first transmission. The transmitting circuit 2 generates the second driving pulses, thereby to drive the piezoelectric transducers T11 to T14. The second transmitted beam is the same as the first transmitted beam. The transmitted ultrasonic beams are reflected in the object and received by the ultrasonic probe 61. The signals received by the piezoelectric transducers T11, T12, T13 and T14 of the ultrasonic probe 61 pass through the MUXs 70, 71, 72 and 73, and are inputted to the MUXs 74 and 76 and the SWs 75 and 77 of the fold over circuit 63. In the MUXs 70, 71, 72 and 73, the channels of the MUXs 74 and 76 and the SWs 75 and 77 are controlled so that the signals from the piezoelectric transducers located in the peripheral portion of the aperture of the ultrasonic probe are made to pass therethrough. In this case, the signals from the piezoelectric transducers T11 and T14 pass through the MUXs 71 and 73 and are inputted to the amplifiers, respectively. The signals from the piezoelectric transducers T12 and T13 are not inputted to the A/Ds 11 and 12 by turning the SWs 75 and 77 off.

The outputs of the fold over circuit 63 are converted into digital data through the amplifiers and the A/Ds 11 and 12, and are added with delay by the beam former 15 thereafter. The output of the beam former 15 is added in the adder 17 to the first received data stored in the memory 16 of aperture adding portion 18. In a manner as described above, a received beam in one direction is beam-formed for wave transmission two times in one direction. In the foregoing, high gains are given to the received signals from the piezoelectric transducers at the central portion of the aperture, and low gains are given to the received signals from the peripheral portion, thus applying weighting.

Such a state of the fold over circuit 63 is referred to as a synthetic aperture adding state, and a corresponding scanning mode is referred to as a synthetic aperture scanning mode. When the second reception is completed, the output from the beam former 15 is beam-formed with the received signals from the piezoelectric transducers T12 and T13 stored in the memory 16 in the adding portion 18. In such a manner as described above, a received beam in one direction is beam-formed for the second wave transmission in the same direction. It is possible to scan the whole object by varying the directivity of wave transmission and reception. The beam-formed received signal thus obtained is detected by the signal processor 19 and displayed on the display unit 20.

As described above, according to the present embodiment, the received signals before beam-formed by the aperture adding portion 18 consist of the received signals from the piezoelectric transducers at the central portion of the aperture of the ultrasonic probe 60 and the received signals from the peripheral portion of the aperture, and high gains are given to the received signals from the piezoelectric transducers at the central portion of the aperture and low gains are given to the received signals from the peripheral portion of the aperture. As a result, there is such an advantage that the received signals from the piezoelectric transducers at the central portion are not disturbed largely even when the object has moved during wave transmission two times, and moreover, have an amplitude larger than that of the signal from the piezoelectric transducers in the peripheral portion of the aperture, thus making it possible to realize a highly precise synthetic aperture. Furthermore, the above-mentioned embodiment also has such an advantage that it is possible to realize the synthetic aperture scanning mode and the fold over scanning mode.

As described above, according to the present invention set forth in claims 1 and 13, the received signals before beam-formed consist of the received signals from the piezoelectric transducers at the central portion of the aperture of the ultrasonic probe and the received signals from the piezoelectric transducers in the peripheral portion, and high gains are given to the received signals from the piezoelectric transducers at the central portion and low gains are given to the received signals from the piezoelectric transducers in the peripheral portion, thus applying weighting. As a result, there is such an advantage that the received signals from the piezoelectric transducers at the central portion are rarely disturbed largely even when the object has moved during wave transmission two times since these received signals are obtainable by reception one time, and moreover, have an amplitude larger than that of the signal from the piezoelectric transducers in the peripheral portion, thus making it possible to realize a highly precise synthetic aperture.

According to the present invention set forth in claims 2 and 4, the received signals before beam-formed consist of the received signals from the piezoelectric transducers at the central portion of the aperture of the ultrasonic probe and the received signals from the piezoelectric transducers in the peripheral portion, and high gains are given to the received signals from the piezoelectric transducers at the central portion and low gains are given to the received signals from the piezoelectric transducers in the peripheral portion. Moreover, weighting is applied dynamically so that the gain in the peripheral portion generally gets lower as the distance of the relative movement of the object gets longer. As a result, there is such an advantage that the received signals from the piezoelectric transducers at the central portion are rarely disturbed even when the object has moved during wave transmission two times since these signals are obtained with transmission one time, and moreover, the amplitude thereof is larger than that of the signal from the piezoelectric transducers in the peripheral portion, thus making it possible to realize a highly precise synthetic aperture.

According to the present invention set forth in claims 3, 4 and 15, the received signals before beam-formed consist of the received signals from the piezoelectric transducers at the central portion of the aperture of the ultrasonic probe and the received signals from the piezoelectric transducers in the peripheral portion, and high gains are given to the received signals from the piezoelectric transducers at the central portion and low gains are given to the received signals from the piezoelectric transducers in the peripheral portion. As a result, there is such an advantage that the received signals from the piezoelectric transducers at the central portion are rarely disturbed largely even when the object has moved during wave transmission two times, and moreover, these signals have an amplitude larger than that of the signals from the piezoelectric transducers in the peripheral portion, thus making it possible to realize a highly precise synthetic aperture. Furthermore, there is also such an advantage that it is possible to obtain a plurality of synthetic aperture outputs at the same time by using a multi-direction beam forming function, thus causing no lowering of the frame rate.

According to the present invention set forth in claims 5, 6 and 16, the received signals before beam-formed consist of the received signals from the piezoelectric transducers at the central portion of the aperture of the ultrasonic probe and the received signals from the piezoelectric transducers in the peripheral portion, and high gains are given to the received signals from the piezoelectric transducers at the central portion and low gains are given to the received signals from the piezoelectric transducers in the peripheral portion. As a result, there is such an advantage that the received signals from the piezoelectric transducers at the central portion are not disturbed largely even when the object has moved during wave transmission two times, and moreover, the amplitude of these signals is larger than that of the signal from the piezoelectric transducers in the peripheral portion, thus making it possible to realize a highly precise synthetic aperture. Furthermore, there is also such an advantage that it is possible to obtain the synthetic aperture output for every wave transmission by combining the multi-direction beam forming function with the received data alignment function for storing the beam-formed beam.

According to the present invention set forth in claims 7 to 13 and 17, the received signals before beam-formed consist of the received signals from the piezoelectric transducers at the central portion of the aperture of the ultrasonic probe and the received signals from the piezoelectric transducers in the peripheral portion, and high gains are given to the received signals from the piezoelectric transducers at the central portion and low gains are given to the received signals from the piezoelectric transducers in the peripheral portion. As a result, there is such an advantage that the received signals from the piezoelectric transducers at the central portion are not disturbed largely even when the object has moved during wave transmission two times, and moreover, the amplitude of the signal is larger than that of the signal from the piezoelectric transducers in the peripheral portion, thus making it possible to realize a highly precise synthetic aperture. Furthermore, there is also such an advantage that it is possible to realize the synthetic aperture scanning mode and the fold over scanning mode.

We claim:

1. An ultrasonic diagnostic equipment comprising:
    transmitting means for transmitting driving pulses a plurality of times;
    arrayed piezoelectric transducers composed of a plurality of piezoelectric transducers for emitting ultrasonic beams from an aperture in accordance with the driving pulses, receiving said ultrasonic beams reflected in an object at said aperture and transmitting received signals, respectively;
    means for applying different weighting to the received signals at a central portion and in a peripheral portion of said aperture; and
    means for beam forming the weighted received signals of the central portion and the peripheral portion.

2. An ultrasonic diagnostic equipment according to claim 1, wherein weighting is applied dynamically at time of each reception.

3. An ultrasonic diagnostic equipment according to claim 2, wherein reception is made simultaneously and in a plurality of directions.

4. An ultrasonic diagnostic equipment according to claim 3, wherein a received data alignment function is provided in synthesization of received signals.

5. An ultrasonic diagnostic equipment according to claim 4, wherein an aperture movement operating function for driving said plurality of piezoelectric transducers selectively is provided.

6. An ultrasonic diagnostic equipment according to claim 3, wherein an aperture movement operating function for driving said plurality of piezoelectric transducers selectively is provided.

7. An ultrasonic diagnostic equipment according to claim 2, wherein an aperture movement operating function for driving said plurality of piezoelectric transducers selectively is provided.

8. An ultrasonic diagnostic equipment according to claim 1, wherein reception is made simultaneously and in a plurality of directions.

9. An ultrasonic diagnostic equipment according to claim 8, wherein a received data alignment function is provided in synthesization of received signals.

10. An ultrasonic diagnostic equipment according to claim 9, wherein an aperture movement operating function for driving said plurality of piezoelectric transducers selectively is provided.

11. An ultrasonic diagnostic equipment according to claim 8, wherein an aperture movement operating function for driving said plurality of piezoelectric transducers selectively is provided.

12. An ultrasonic diagnostic equipment according to claim 1, wherein an aperture movement operating function for driving said plurality of piezoelectric transducers selectively is provided.

13. An ultrasonic diagnostic equipment comprising:
    transmitting means for transmitting driving pulses a plurality of times;
    arrayed piezoelectric transducers composed of a plurality of piezoelectric transducers for emitting ultrasonic beams from an aperture in accordance with the driving pulses, receiving said ultrasonic beams reflected in an object at said aperture and transmitting received signals, respectively;
    means for applying weighting so that the received signals at the central portion of said aperture become larger in amplitude than the received signals in the peripheral portion thereof; and
    means for beam forming the weighted received signals of the central portion and peripheral portion.

14. An ultrasonic diagnostic equipment according to claim 13, wherein weighting is applied dynamically at time of each reception.

15. An ultrasonic diagnostic equipment according to claim 13, wherein reception is made simultaneously and in a plurality of directions.

16. An ultrasonic diagnostic equipment according to claim 13, wherein a received data alignment function in synthesization of received signals is provided.

17. An ultrasonic diagnostic equipment according to claim 13, wherein an aperture movement operating function for driving said plurality of piezoelectric transducers selectively is provided.

* * * * *